US 6,687,694 B2

(12) United States Patent
Miller

(10) Patent No.: US 6,687,694 B2
(45) Date of Patent: Feb. 3, 2004

(54) CONFIGURABLE PATTERN RECOGNITION AND FILTERING TOOL

(76) Inventor: Jim Miller, P.O. Box 747, Carlsbad, CA (US) 92018

( * ) Notice: Subject to any disclaimer, the term of this patent is extended or adjusted under 35 U.S.C. 154(b) by 171 days.

(21) Appl. No.: 09/756,511

(22) Filed: Jan. 9, 2001

(65) Prior Publication Data

US 2002/0040357 A1 Apr. 4, 2002

Related U.S. Application Data

(60) Provisional application No. 60/174,569, filed on Jan. 5, 2000.

(51) Int. Cl.[7] .............................................. G06F 17/00
(52) U.S. Cl. ................ 707/6; 706/47; 706/20
(58) Field of Search ....................... 707/1–10; 706/47, 706/20

(56) References Cited

U.S. PATENT DOCUMENTS

| | | | | |
|---|---|---|---|---|
| 5,040,214 A | * | 8/1991 | Grossberg et al. | 706/20 |
| 5,379,420 A | * | 1/1995 | Ullner | 707/6 |
| 5,412,756 A | * | 5/1995 | Bauman et al. | 706/45 |
| 5,606,646 A | * | 2/1997 | Khan et al. | 706/2 |
| 5,668,988 A | * | 9/1997 | Chen et al. | 707/6 |
| 5,687,286 A | * | 11/1997 | Bar-Yam | 706/20 |
| 6,006,213 A | * | 12/1999 | Yoshida | 706/14 |
| 6,138,117 A | * | 10/2000 | Bayardo | 707/6 |
| 6,295,367 B1 | * | 9/2001 | Crabtree et al. | 382/103 |
| 6,434,561 B1 | * | 8/2002 | Durst et al. | 707/6 |
| 6,459,809 B1 | * | 10/2002 | Jensen et al. | 707/6 |
| 6,556,983 B1 | * | 4/2003 | Altschuler et al. | 706/20 |

OTHER PUBLICATIONS

"Computing Minimal Spanning Subgraphs in Linear Time"—Xiaofeng Han, Pierre Kelsen, Vijaya Ramachandran and Robert Tarjan—Chapter 19 (pps: 146–156)—ACM–1998.*

"Combinatorial Pattern Discovery for Scientific Date: Some Preliminary Results"—Jason Tsong–Li Wang, Gung–Wei Chirn, Thomas G. Marr, Bruce Shapiro, Dennis Shasha and Kaizhong Zhang—1994 ACM (pps: 115–125).*

"A Unifying Framework for the Theory of Iterative Arrays of Machines"—Serofino Amoroso, Edward Ideblein and Hisao Yamad—ACM, May 1969 (pps: 259269).*

"Solomonoff Coding as a Means of Introducing Prior Information in Syntactic Pattern Recognition"—Ana L. N. Fred and Jose M N. Leitao 1994–IEEE (pps: 14–18).*

* cited by examiner

*Primary Examiner*—Shahid Alam
*Assistant Examiner*—Anh Ly
(74) *Attorney, Agent, or Firm*—Steven W. Webb

(57) ABSTRACT

Highly configurable software apparatus for recognizing and manipulating user-defined patterns in an input data stream. It allows the user to define unlimited combinations and sequences of patterns, and actions to perform when patterns are recognized. Patterns are defined in terms of user-defined sets. Patterns are linked in graph-like structures. As the input stream is scanned the apparatus progresses from one pattern (subpattern) to the next. The rules the apparatus follows to make transitions from one pattern to the next can be configured. Configured actions are performed as patterns are recognized in the input stream.

7 Claims, No Drawings

CONFIGURABLE PATTERN RECOGNITION AND FILTERING TOOL

RELATED U.S. APPLICATIONS

This application supplements and completes Provisional Application No. 60/174,569, filed Jan. 5, 2000.

BACKGROUND OF THE INVENTION

The present invention relates to information processing systems, in particular, to pattern recognition and manipulation methods.

Many data transformation tasks—searching, conversion, extraction, and parsing, for example, are currently performed with tools that must be configured or programmed by someone with a relatively high degree of skill. These skills include:

- the ability to program in languages such as C or C++,
- the ability to use program tools such as Lex, Yacc, and AWK,
- the ability to create "regular expressions".

The present invention is a tool that attempts to simplify the creation of data transformation task processors. The user can create a solution to a data transformation need by configuring tables and graphs, without having to learn the syntax of any language.

SUMMARY OF THE INVENTION

The present invention's design is based on the idea that many data transformation tasks involve the same fundamental repetitive process:

- recognition of a pattern in the input,
- transition to another "state" based on recognition of the next pattern in the input. Internally, the present invention is very general and abstract. It knows about sets and patterns, states and transitions, and views the input as nothing but a stream of values. It knows nothing about any specific file format, so it can be configured to work with almost any of them. The details of the transformation task are specified in the configuration. The design of the data used to configure the present invention lends itself to being presented to the user as:
- a small number of relatively uncomplicated tables,
- one or more relatively uncomplicated graphs.

The graph(s) can be presented to the user visually as a collection of nodes and links (arrows) with textual annotations. The user chooses the names, i.e. "tags", of virtually all of the configurable items, including:

- sets,
- patterns,
- the nodes in the graph.

The annotated graph is thereby able to provide the user with a "picture" of the processing to be performed in terms of the user's choosing.

This invention is applicable to document systems, databases, word processors, and other data and software sets.

DESCRIPTION OF THE PREFERRED EMBODIMENT

Refer to the attached copy of the preferred embodiment description, submitted with the provisional application, No. 60/174,569, for a description of the preferred embodiment of this invention.

Although the preceding specification contains many specific details, these should not be construed as limiting the scope of the invention but as merely providing an illustration of the preferred embodiment of the invention. For example, the list of recognizable patterns could be expanded to include (1) sets of text strings, (2) sets of byte sequences, and (3) patterns defined recursively as PGraphs.

Thus the scope of the invention should be determined by the appended claims and their legal equivalents, rather than by the example given.

Description of Configurable Pattern Recognition and Filtering Tool (CPRFT)

The "Configurable Pattern Recognition and Filtering Tool" software utility consists of two principal components:

1. The Configuration Facility.
2. The PRF "Engine".

The Configuration Facility

The Configuration Facility supports definition of the following data items required by the PRF Engine:

Sets
Patterns
a PGraph (composed of Nodes and Links)
Variables
Actions
Input streams
Output streams The Configuration Facility supports definition of all of the data required by the PRF Engine. The definition created by the Configuration Facility can be saved to a file for later use. A free-format textual "comment" can be placed in and associated with the definition.

When the appropriate data items have been defined the PRF Engine can be invoked to perform a PRF "run".

Sets

A set is a set of values. It is defined by the user as a sequence of individual values and value ranges. The PRF Engine currently supports sets of byte values (valid range: 0–255). Every set is identified by a unique user-defined textual identifier, or tag.

Patterns

A pattern is defined by the user as a sequence of subpatterns. A subpattern is defined by 1) an associated set, 2) a minimum length and 3) a maximum length. A subpattern is said to be recognized if the consecutive sequence of input stream values at the current input stream location, of at least the minimum subpattern length, are all elements of the subpattern's associated set. Input stream values following the recognized subpattern, that are elements of the subpattern's associated set, may be included as part of the recognized subpattern up to and including the subpattern's maximum length. The "may be" in the preceding sentence is elaborated upon later, under the "Ambiguity" heading.

A pattern is said to be recognized if all of its subpatterns are recognized, sequentially, in the input stream:

TempInputStreamIndex=InputStreamIndex (current input stream location)

For each subpattern in the pattern:

```
{
    If the subpattern is recognized
    Then - continue:
        Advance TempInputStreamIndex to the next input stream value
        for each input stream value recognized as part of the subpattern.
    Else - this pattern is not recognized - terminate the
    "For each subpattern" loop.
}
```

-continued

```
If all of the pattern's subpatterns are recognized
Then -
    The pattern is recognized ...
    Process the pattern,
    InputStreamIndex = TempInputStreamIndex (advance the input
    stream location past the recognized pattern).
```

A string is a special case of a pattern—a sequence of characters that can be typed in at a computer keyboard. The Configuration Facility allows strings to be used anywhere patterns are. This special support of string definition is provided so that a simple character string pattern need not be defined (cumbersomely) as a sequence of subpatterns. A string is recognized if it occurs at the current input stream location. Case-sensitivity can be enabled or disabled for string recognition.

A pattern of zero maximum length, or "bookend" pattern, can be defined. A bookend pattern matches either the beginning or the end of the input stream, depending on the input stream location. A bookend pattern doesn't match any input stream values; it is considered recognized before any input stream values have been examined and after all input stream values have been examined.

Every pattern is identified by a unique user-defined tag.

PGraph

PRF Engine processing is driven by a single PGraph, which is composed of one or more user-defined nodes connected to each other by user-defined links. Any two nodes in the graph can be connected by a link. A link connects exactly two nodes and is directional, so that for each link one node is the "from" node and the other is the "to" node. A pair of nodes A and B can be linked "circularly", i.e. there can be a link from A to B, and from B to A. There is no requirement that all nodes be linked somehow to other nodes. Single nodes or connected groups of nodes can be left disconnected from other nodes/groups ("parked"), awaiting activation by the creation of a link or by the "assign start node" action (described later).

At any time during a PRF run exactly one node is the current node. At the start of a PRF run the current node is set to the user-definable start node. During a PRF run the PGraph is traversed: one of the nodes the current node is linked to may become the new current node, depending on the next node pattern recognized in the input stream.

Exactly one node in the PGraph is defined as the start node, which identifies the starting point of the PGraph traversal. The start node can be assigned/reassigned by the "assign start node" action during a PRF run. The start node is user-definable but a default is assigned by the Configuration Facility (e.g. the first node created).

Nodes

A node has associated with it exactly one pattern (or string). This node-pattern association is user-defined. A node is said to be recognized if its associated pattern/string has been recognized in the input stream.

A node can be identified by a user-defined tag. This tag is used to refer to the node elsewhere in the definition created by the Configuration Facility. The tag on a node is optional, however, and need not be unique. If a group of two or more nodes shares the same tag, that tag refers to the node in that group that was most recently recognized in the input stream. If none of the nodes grouped by a non-unique tag has been recognized in the current input stream, that tag refers to a null node whose pattern length is zero.

A node has associated with it zero or more user-defined actions, which determine processing to be performed when the node is recognized in the input stream.

Every node has an ordinal number. This number is unique for each node, ranging from zero to the number of nodes in the PGraph. The Configuration Facility provides defaults for the node ordinal number (e.g. order of node creation), but the user can also define the node ordinal numbers to facilitate, for example, node selection via use of the tab key ("tabbing through" the nodes). The node ordinal numbers currently have no effect on the operation of the PRF Engine—they are used solely by the Configuration Facility.

Links

A link connects two nodes. It is directional, establishing a "from" and a "to" node. This direction determines the order of PGraph node traversal during a PRF run.

Every link has a number. The links emanating from a given node are numbered uniquely to establish the order for checking which of the nodes the given node is linked "to" will become the next current node during PGraph traversal.

The Configuration Facility provides defaults for the link numbers (e.g. order of link creation), but the link number can also be defined by the user. If the user specifies link number N for a link, and N has already been assigned to another link emanating from the same node, the Configuration Facility will increment by one the number of all links emanating from that node whose link number is greater than or equal to N before assigning N to the newly-numbered link, thereby preserving link number uniqueness.

The Configuration Facility prevents the creation of duplicate links. A duplicate link is one that has the same "from" and "to" nodes as an existing link.

Variables

A variable is a data item that can be assigned an initial value and reassigned values during a PRF run. Currently supported variable types include:

Strings

Byte sequences

Every variable is identified by a unique user-defined tag.

A Counter is a variable of type integer.

Actions

Actions can be invoked at various points during a PRF run: before or after the run itself, before or after processing an input stream, and when a node is recognized. Actions are user-defined but are derived from a predefined list of available actions, including:

Transfer input stream (recognized) data associated with a node to an output stream Transfer special data (e.g. stream/file name) to an output stream Set, increment, or transfer to an output stream the value of a variable or a counter Assign the start node Execute a user-defined action Execute a user-defined group of actions (a procedure)

Halt processing of the current input stream

Halt the PRF run

The "transfer to an output stream" actions can also be configured to transfer output to, for example, the Windows clipboard and other data destinations.

Each action type requires certain parameters:

| | |
|---|---|
| Transfer data to output stream | data identifier (e.g. node tag) |
| | output stream tag |
| Variable operations | variable/counter tag |
| | value |

-continued

| | |
|---|---|
| User-defined procedure | procedure (action group) tag execute once per stream (y/n) |
| User-defined action | action identifier |
| Assign start node | node tag |
| Halt | no parameters required |

The list of potential actions is practically limitless and will be revised and enhanced in subsequent releases of CPRFT.

Input Streams

The PRF Engine processes a single input stream (e.g. file) at a time. A single PRF run processes a succession of one or more input streams. The Configuration Facility supports definition of the input stream sequence, composed of one or more stream specifications.

Output Streams

The PRF Engine can output data to any number of streams. Every output stream is identified by a unique user-defined tag and an access mode (e.g. overwrite, append, etc.).

PGraph Graphical Definition

The Configuration Facility supports graphical definition of the PGraph. [Note: in the following discussion, the term "click" refers to a single click of the left mouse buffon.] Nodes can be placed on the Configuration Facility drawing surface (e.g. the Windows client area) by double-clicking at the desired node location. A node can be selected for modification by single-licking on its graphic. The node selection can also be changed by pressing the tab key, which will cause the node selection to "traverse" the PGraph in node ordinal number order, ascending or descending ordinal number order for right or left tab, respectively. A node's property (attribute) menu can be accessed by selecting the node and pressing <Enter>, or by double-licking on the node's graphic.

A node can be moved on the drawing surface by selecting it and dragging it with the left mouse button held down. A node can also be moved by selecting it and using the left/right/up/down arrow keys to perform fine adjustments of the node location. A node can be deleted by selecting it and pressing the <Delete> key, or by accessing the node's property menu and selecting the "Delete" menu option. Node properties (node tag, pattern, string, "links to", start node, actions, ordinal number, etc.) can be modified using dialogs accessed via options in the node's property menu.

Node links are defined by selecting the "Link to" option of the "from" node property menu. "Link to" initiates a drawing operation, creating a line originating at the selected node (the "from" node) and terminating at the mouse location. The line termination point follows mouse movements until a "to" node for the link is selected. The "to" node for the link is selected by single-clicking on any other node in the PGraph. The link drawing operation can be canceled at any time by single-clicking anywhere but on another node. The user merely chooses the two nodes to connect by a link; the Configuration Facility determines how to draw the link once the "to" node is selected.

Every link has a graphical representation, drawn by the Configuration Facility as connected line segments (3, currently) with an arrow adjoining and pointing to the "to" node. A small box is drawn near the midpoint of the link graphic; this box displays the link's number. Link selection is performed in a similar manner to node selection: clicking on the link's box graphic selects the link; a link's property (attribute) menu can be accessed by selecting the link and pressing <Enter>, or by double-clicking on the link's box graphic. A link can be deleted by selecting it and pressing the <Delete> key, or by accessing the link's property menu and selecting the "Delete" menu option. If a node is deleted all links to and from that node are automatically deleted. Link properties (link number, etc.) can be modified using dialogs accessed via the link's property menu. Links are automatically redrawn by the Configuration Facility when nodes are moved or deleted by the user.

Configuration data not acquired from the user graphically (e.g. sets, patterns, variables, actions, streams) is entered tabularly via menu selections and dialogs.

User Input Checking

The Configuration Facility enforces, and facilitates, the correctness and consistency of user input. Data items that refer to other data items (via tags, usually) must be defined after the items they refer to. The user cannot make a reference to an undefined tag. Context-sensitive help is available wherever, for example, a tag must be chosen: upon requesting help (e.g. pressing the <F1> key) the user is presented with a list displaying the appropriate tags available for use in the current data entry context.

The PRF Engine

During a PRF run the PRF Engine processes the user-defined sequence of input streams, one stream at a time. The current input stream is "opened" and the PRF Engine sets its input stream location (the current position within the input stream, referred to hereafter as the stream location) to the beginning of the input stream, i.e. position zero. The current node is also set to the start node.

At this point PGraph traversal begins. The stream location is advanced until the start node's pattern is recognized, or until the end of the input stream is encountered.

When the current node is recognized (i.e. when the pattern associated with the current node is recognized at the current input stream location) the PRF Engine does several things:
  It performs the actions associated with the current node,
  it attempts to determine the next node to become the current node in the PGraph traversal.

Performing the actions simply means executing in sequence the list of actions (if there are any) associated with the current node.

To select the next current node, the PRF Engine considers the "to" nodes of each link emanating "from" the current node. Each of these "to" nodes is a potential next node. The potential next nodes are examined in link number order. When one of these potential next nodes is recognized in the input stream immediately following the values recognized as the current node's pattern, that potential next node becomes the current node. If no potential next node is recognized the start node is selected as the next current node and the PRF Engine once again scans the input stream in an attempt to recognize the start node.

PGraph traversal for the current input stream ends when the stream location can no longer be advanced within the input stream, i.e. when the end of the input stream is encountered. PGraph traversal can also be terminated by user-defined "halt" actions.

Ambiguity

Every subpattern of a pattern has a minimum and maximum length. If a subpattern's maximum length exceeds its minimum length a potential ambiguity arises. Beyond the minimum length, and up to and including the maximum length, input stream values contained in the current subpattern's set may also be contained in the next subpattern's set (if there is a next subpattern), or may be recognized as (the start of) one of the potential next nodes' patterns (if there are any potential next nodes). The question arises: should these ambiguous input stream values be "assigned to" the current subpattern, or to the next subpattern/potential next node to which they may also be assigned? In other words, when should the PRF Engine, in such an ambiguous situation, make the transition from the current subpattern to the next possible state? Among the possibilities are:

Making the transition to the next state as soon as possible (ASAP), making the transition as late as possible (ALAP).

The PRF Engine can support both "ASAP" and "ALAP" transition rules. The current version makes transitions ALAP if the next state is a subpattern (i.e. if the subpattern being examined is not the last one in its containing pattern). Transitions are ASAP if the next state is a potential next node (i.e. if the subpattern being examined is the last one in its containing pattern). Experimentation has shown this combination to be effective, but options may be provided to make these transition modes user-definable in a future version of CPRFT.

"Transition ALAP", unlike "ASAP", regards only the value at the current input stream location, i.e. doesn't look ahead. Input stream values are associated with the current subpattern until one of the following becomes true:

The input stream value is not a member of the subpattern's set, the subpattern's maximum length has been attained, the end of the input stream has been reached.

"Transition ASAP" between nodes allows, for example, definition of a subpattern of "anythings" (with a set containing all possible values) followed by a next state (potential next node) whose pattern is specific, thereby instructing the PRF Engine to effectively look ahead and "seek" the specific pattern.

Implementation Details

Menus

CPRFT has a single standard main menu, consisting of:

| Top-level options: | Submenus: | |
|---|---|---|
| Definition File | | |
| | New | Create a new definition |
| | Open | Open an existing definition |
| | Save | Save the current definition |
| | Save as | Save the current definition as . . . |
| | Comment | Edit the current definition's comment |
| | Exit | Exit CPRFT |
| Input/ Output | | |
| | Input streams | Define input stream specifications - Single dialog: list of tags, stream specifications, "search subdirectories" checkboxes |
| | Output streams | Define output stream specifications - Single dialog: list of tags, stream specifications, "append" checkboxes |
| Definitions | | |
| | Sets | Define sets - Primary dialog: list of set tags Secondary dialog: list of start & end values |
| | Patterns | Define patterns - Primary dialog: list of pattern tags Secondary dialog: list of associated sets, min & max counts |
| | Variables | Define variables - Single dialog: list of variable tags, types, initial values |

-continued

| Top-level options: | Submenus: | |
|---|---|---|
| | Counters | Define counters - Single dialog: list of counter tags, initial values |
| | 1 Pre-run actions | Define actions to perform before a PRF run - Single dialog: list of action types & parameters |
| | 2 Pre-stream actions | Define actions to perform before processing each input stream - Single dialog: list of action types & parameters |
| | 3 Post-stream actions | Define actions to perform after processing each input stream - Single dialog: list of action types & parameters |
| | 4 Post-run actions | Define actions to perform after a PRF run - Single dialog: list of action types & parameters |
| | Action groups | Define action groups (procedures) - Primary dialog: list of action group tags Secondary dialog: list of action types & parameters |
| Run | | |
| | Run | Run the PRF Engine using the current definition |
| View | | |
| | <Output streams> | View output streams (output stream tag selection) |
| | Status | View program status information |
| Options | | |
| | File viewer | Define the file viewing program (e.g. notepad.exe) |
| Help | | |
| | Index | View the CPRFT help file |
| | Using help | System instructions on using help |
| | About | Brief description of the CPRFT program |

Every node has a single properties menu, consisting of:

| Top-level options: | |
|---|---|
| Properties | Define node properties (tag, pattern, ordinal number) |
| String | Define an optional string associated with the node (string, "ignore case" checkbox) - see note below |
| Actions | Define actions associated with the node (list of action types & parameters) |
| Link to . . . | Create a link to another node |
| Start node | Designate the node as the start node |
| Delete | Delete the node |

Note:
Both a string and a pattern can be defined for a node. A string is treated as a type of pattern, and only one pattern can be defined for a node, so if both the string and the pattern are defined for the node the pattern takes precedence, i.e. the string definition is ignored.

Every link has a single properties menu, consisting of:

| Top-level options: | |
|---|---|
| Renumber | Define the link's number |
| Delete | Delete the link |

Sets

CPRFT currently supports sets of byte values (valid range: 0–255) stored and retrieved as bits in a 256-element (bit) map.

Tag Case Sensitivity

Tags are case-sensitive. For instance, tags "SearchString" and "searchstring" are distinct tags.

What is claimed is:

1. An apparatus for recognizing user-defined patterns in a data stream, the apparatus comprising
- a subpattern configuring means, each subpattern comprising
  - a value set and a range,
    - each value set comprised of a list of values,
    - each range comprising a minimum number and a maximum number of occurrences of said values contained in said value set,
- a subpattern sequence configuring means, each subpattern sequence comprised of one or more subpatterns, each of said subpatterns being followed in said sequence by zero or more said subpatterns,
- a transition rule configuring means, said means used to configure the rules that the apparatus follows when making transitions between said subpatterns in said sequences,
- a starting subpattern designation means, said starting subpattern being the first subpattern in said sequences to be sought by the apparatus in said data stream, said starting subpattern to be sought by the apparatus when the apparatus is unable to continue making transitions from one subpattern to another in said data stream,
- an action configuration means that configures actions to be performed by the apparatus when events occur during the operation of the apparatus, said actions constituting the results of the operation of the apparatus,
- said apparatus recognizing patterns in said data stream by traversing said sequences, beginning the traversal at said starting subpattern, continuing said traversal by making transitions according to said transition rules between subpatterns in said sequences, resuming said traversal at said starting subpattern when unable to make a transition from the current subpattern to another in said sequences, said apparatus producing results with said actions,
- whereby any data stream may be divided into segments per the configuration of said apparatus.

2. An apparatus as in claim 1,
wherein said transition rules include the ability to make the transition between adjacent subpatterns in said sequences as late as possible, said apparatus considering the current value in said data stream, the configuration of the current subpattern in said sequences, whereby the overhead of examination of any subsequent subpatterns may be avoided.

3. An apparatus as in claim 2, wherein said transition rules include the ability to make the transition between adjacent subpatterns in said sequences as soon as possible, said apparatus considering the current value in said data stream, the values succeeding said current value in said data stream, the configuration of the current subpattern in said sequences, the configuration of the subsequent subpatterns in said sequences, whereby a subpattern with a substantially inclusive set, being followed in said sequences by one or more less-inclusive subpatterns, causes said apparatus to search for said less-inclusive subpatterns.

4. An apparatus as in claim 3, further including a means of configuring priorities for attempts by said apparatus to make the transition from one subpattern to another when said subpattern is followed by more than one subpattern in said sequences.

5. An apparatus as in claim 4, further including a means of configuring a pattern, said pattern comprising one or more said subpatterns, whereby said pattern can represent its respective subpatterns anywhere in the configuration of said apparatus.

6. An apparatus as in claim 5, further including a means of identifying with a tag one or more sub-sequences of said sequences, said tag thereby defining a group of said sub-sequences, said tag referring during operation of said apparatus to the member of said group most recently recognized in said data stream.

7. An apparatus as in claim 6, further including a means of configuring a "bookend" subpattern of maximum length zero, said "bookend" subpattern being considered recognized by said apparatus before scanning of said data stream, being considered recognized by said apparatus after scanning of said data stream, whereby beginning-of-input and end-of-input conditions can be handled.

* * * * *